(12) United States Patent
Perry (10) Patent No.: US 12,136,751 B2
(45) Date of Patent: Nov. 5, 2024

(54) COMBINED NATURAL GAS POWER GENERATION AND $CO_2$ SEQUESTRATION SYSTEM

(71) Applicant: BLOOM ENERGY CORPORATION, San Jose, CA (US)

(72) Inventor: Martin Perry, Mountain View, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 449 days.

(21) Appl. No.: 17/564,720

(22) Filed: Dec. 29, 2021

(65) Prior Publication Data

US 2022/0216489 A1    Jul. 7, 2022

Related U.S. Application Data

(60) Provisional application No. 63/133,855, filed on Jan. 5, 2021.

(51) Int. Cl.
| | |
|---|---|
| *H01M 8/04082* | (2016.01) |
| *B60L 50/72* | (2019.01) |
| *F17C 7/04* | (2006.01) |
| *F25J 1/00* | (2006.01) |
| *H01M 8/04007* | (2016.01) |
| *H01M 8/04014* | (2016.01) |
| *H01M 8/04029* | (2016.01) |

(Continued)

(52) U.S. Cl.
CPC ......... *H01M 8/04208* (2013.01); *B60L 50/72* (2019.02); *F17C 7/04* (2013.01); *F25J 1/0027* (2013.01); *F25J 1/0082* (2013.01); *H01M 8/04014* (2013.01); *H01M 8/04029* (2013.01); *H01M 8/04074* (2013.01); *H01M 8/04164* (2013.01); *B60L 2200/32* (2013.01); *F17C 2221/033* (2013.01); *F17C 2227/0157* (2013.01); *F17C 2227/0351* (2013.01); *F17C 2270/0105* (2013.01); *F25J 2205/20* (2013.01); *F25J 2260/60* (2013.01); *H01M 2008/1293* (2013.01); *H01M 2250/20* (2013.01)

(58) Field of Classification Search
None
See application file for complete search history.

(56) References Cited

U.S. PATENT DOCUMENTS

| | | | |
|---|---|---|---|
| 9,190,673 B2 | 11/2015 | Venkataraman et al. | |
| 11,614,003 B2 * | 3/2023 | Han | F01K 7/32 |
| | | | 60/39.182 |

(Continued)

OTHER PUBLICATIONS https://www.continentalcarbonic.com/how-is-dry-ice-made.html "visited Dec. 29, 2021".

*Primary Examiner* — S. Joseph Morano
*Assistant Examiner* — Jovon E Hayes
(74) *Attorney, Agent, or Firm* — THE MARBURY LAW GROUP PLLC (57) ABSTRACT

A system and method for power generation and $CO_2$ sequestration include a fuel cell system configured to generate power using natural gas (NG), a container configured to store liquid natural gas (LNG), and a fluid processor configured to convert LNG received from the container into NG and to convert exhaust output from the fuel cell system to dry ice by transferring heat between and the LNG and the exhaust.

20 Claims, 4 Drawing Sheets

(51) Int. Cl.
*H01M 8/04119* (2016.01)
*H01M 8/12* (2016.01)

(56) References Cited

U.S. PATENT DOCUMENTS

| | | | |
|---|---|---|---|
| 2012/0178003 A1* | 7/2012 | Venkataraman | H01M 8/04007 |
| | | | 429/408 |
| 2020/0328445 A1* | 10/2020 | Weingaertner | H01M 8/0612 |
| 2021/0020974 A1* | 1/2021 | Ballantine | B01D 53/62 |
| 2021/0214050 A1* | 7/2021 | Gregos-Mourginakis | |
| | | | B63B 25/16 |
| 2021/0328238 A1* | 10/2021 | Cedarleaf-Pavy | F28D 1/0358 |

* cited by examiner

COMBINED NATURAL GAS POWER GENERATION AND $CO_2$ SEQUESTRATION SYSTEM

FIELD

Exemplary embodiments relate to a natural gas power generation and $CO_2$ sequestration system, and in particular, to a natural gas power generation system including one or more natural gas fuel cell power modules and $CO_2$ sequestration system configured to convert $CO_2$ output from the power module into dry ice.

BACKGROUND

Natural gas (NG) is viewed as a lower carbon substitute to traditional power sources such as coal. NG contains predominantly methane ($CH_4$) with ethane ($C_2H_6$) propane, carbon dioxide, nitrogen and other compounds included therein. Liquefied natural gas (LNG) is natural gas that has been cooled down to liquid form for ease and safety of non-pressurized storage or transport. LNG takes up about 1/600th the volume of NG in the gaseous state (at standard conditions for temperature and pressure). LNG is odorless, colorless, non-toxic and non-corrosive.

NG is mainly converted to LNG for transport over the seas where laying pipelines is not technically and economically feasible. The LNG liquefaction process involves removal of certain components, such as dust, acidic gases, helium, water, and heavy hydrocarbons, which could cause difficulty downstream. The NG is then condensed into a liquid at close to atmospheric pressure by cooling it to approximately −162° C.

The majority of LNG is transported around the globe via specialized LNG carrier ships. Such ships include containment vessels configured to maintain the LNG at or below a temperature of about −163° C., e.g., below the −161° C. condensation temperature of natural gas. LNG is generally not transported overland, since any lapse in refrigeration may result in a physical explosion known as rapid phase transition (RPT), as the volume of the LNG rapidly increases by 600 times during regasification. As such, LNG transport is generally confined to specialized LNG vessels, and LNG processing is generally confined to seaside natural gas liquefaction/regasification terminals.

Controlled LNG regasification is performed by gradually warming the natural gas back up to a temperature of over 0° C. This process generally occurs at high pressures of 60 to 100 bar, usually in a series of seawater percolation heat exchangers, which is the most energy efficient technique when water of the right quality is available. Alternatively, some of the natural gas may be burned to provide the heat necessary for regasification. However, in such methods the energy invested to condense the LNG that is released during gasification is lost.

SUMMARY

Various embodiments provide a combined system for power generation and $CO_2$ sequestration, comprising: a fuel cell system configured to generate power using natural gas (NG); a container configured to store liquid natural gas (LNG); and a fluid processor configured to convert LNG received from the container into NG and to convert exhaust output from the fuel cell system to dry ice by transferring heat between and the LNG and the exhaust.

Various embodiments provide a method of combined power generation and $CO_2$ sequestration, comprising: providing natural gas (NG) to a fuel cell system to generate power; cooling exhaust output from fuel cell system using a first heat exchanger; compressing cooled exhaust output from the first heat exchanger using a compressor; cooling compressed exhaust output from the compressor using a second heat exchanger provided with liquid natural gas (LNG), to generate liquid $CO_2$; converting the liquid $CO_2$ into dry ice; vaporizing the LNG to generate NG; and providing the generated NG to the fuel cell system.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Transportation is a primary source of global $CO_2$ emissions and/or air pollution. In particular, the shipping industry is subject to increasingly stringent emission controls. Accordingly, it is desirable to reduce shipping emissions.

Natural gas (NG) is a fuel source that can provide lower emissions, as compared to fuel oil or diesel fuel commonly used as a maritime fuel. However, NG power generation systems, such as natural gas turbines, still contribute to global $CO_2$ emissions. In addition, NG has a relatively low power density, making it impractical for use as a fuel source for shipping.

In contrast, LNG has a much higher power density. In addition, LNG storage systems currently exist for maritime applications, such as the storage systems found aboard LNG container ships. However, LNG should be regasified prior to being utilized as a fuel source in the shipping industry.

According to various embodiments, fuel cell systems are configured to be deployed on ships and that utilize the LNG as a feedstock for power generation. In addition, the systems may be configured to sequester $CO_2$ emitted from fuel cell exhaust. In particular, the systems may be configured to generate dry ice, while utilizing heat from fuel cell exhaust to regasify LNG.

Thus, various embodiments provide systems and methods for efficiently utilizing LNG as a primary and/or secondary power source in shipping applications. Further, various embodiments provide maritime power generation systems that are capable of efficiently capturing $CO_2$ and regasifying LNG.

Figure 1:
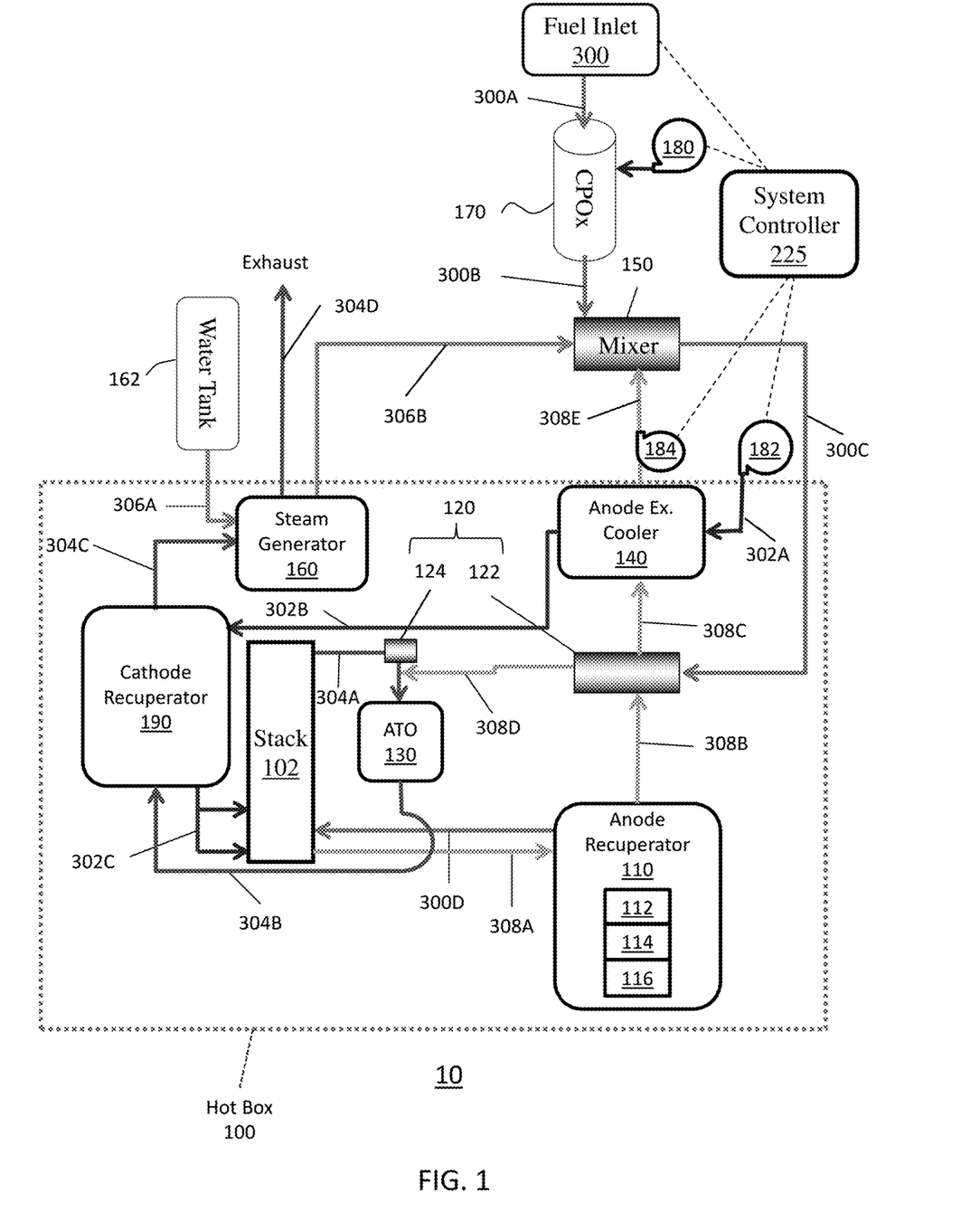
FIG. 1 is a schematic of a SOFC fuel cell system, according to various embodiments of the present disclosure.

FIG. 1 is a schematic representation of a solid oxide fuel cell (SOFC) power module 10, according to various embodiments of the present disclosure. Referring to FIG. 1, the module 10 includes a hotbox 100 and various components disposed therein or adjacent thereto.

The hot box 100 may contain fuel cell stacks 102, such as a solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). The stacks 102 may be arranged over each other in a plurality of columns.

The hot box 100 may also contain an anode recuperator 110, a cathode recuperator 190, an anode tail gas oxidizer (ATO) 130, an anode exhaust cooler 140, an ATO mixer/injector (which is referred herein as an ATO injector for brevity) 120 including a splitter 122 and a vortex generator 124, and a steam generator 160. The module 10 may also include a catalytic partial oxidation (CPOx) reactor 170, a mixer 150, a CPOx blower 180 (e.g., air blower), a system blower 182 (e.g., air blower), and an anode recycle blower 184, which may be disposed outside of the hotbox 100. However, the present disclosure is not limited to any particular location for each of the components with respect to the hotbox 100.

The CPOx reactor 170 receives a fuel inlet stream from a fuel inlet 300, through fuel conduit 300A. The fuel inlet 300 may be a utility gas line including a valve to control an amount of fuel provided to the CPOx reactor 170. The CPOx blower 180 may provide air to the CPOx reactor 170 during module 10 start-up, and then turned off during steady-state operating mode when the fuel cell stacks 102 reach a steady-state operating temperature above 700° C., such as 750 to 900° C. The fuel in the steady state and/or a mixture of fuel and air during start-up may be provided to the mixer 150 by fuel conduit 300B. Fuel flows from the mixer 150 to the anode recuperator 110 through fuel conduit 300C. Fuel flows from the anode recuperator 110 to the stack 102 through fuel conduit 300D. The module 10 may also include one or more fuel reforming catalysts 112, 114, and 116 in the anode recuperator 110.

The main air blower 182 may be configured to provide an air stream (e.g., air inlet stream) to the anode exhaust cooler 140 through air conduit 302A. Air flows from the anode exhaust cooler 140 to the cathode recuperator 190 through air output conduit 302B. The air flows from the cathode recuperator 190 to the stack 102 through air conduit 302C.

Anode exhaust (i.e., fuel exhaust) generated in the stack 102 is provided to the anode recuperator 110 through anode exhaust outlet conduit(s) 308A. The anode exhaust may contain unreacted fuel. The anode exhaust may also be referred to herein as fuel exhaust. The anode exhaust may be provided from the anode recuperator 110 to the splitter 122 by the anode exhaust conduit 308B. A first portion of the anode exhaust may be provided from the splitter 122 to the ATO 130 via an anode exhaust output conduit 308D. A second portion of the anode exhaust may be provided from the splitter 122 to the anode exhaust cooler 140 by a first anode exhaust recycling conduit 308C. Anode exhaust may be provided from the anode exhaust cooler 140 to mixer 150 by a second anode exhaust recycling conduit 308E. The anode recycle blower 184 may be configured to move anode exhaust though the second anode exhaust recycling conduit 308E, as discussed below.

Cathode exhaust (e.g., air exhaust) generated in the stack 102 flows to the ATO 130 through cathode exhaust conduit 304A. The cathode exhaust may also be referred to herein as air exhaust. The vortex generator 124 may be disposed in the cathode exhaust conduit 304A and may be configured to swirl the cathode exhaust. Conduit 308D may be fluidly connected to the cathode exhaust conduit 304A, downstream of the vortex generator 124. The swirled cathode exhaust exiting the vortex generator 124 may mix with the anode exhaust provided by the splitter 122 before being provided to the ATO 130. The mixture may be oxidized in the ATO 130 to generate ATO exhaust. The ATO exhaust flows from the ATO 130 to the cathode recuperator 190 through exhaust conduit 304B. Exhaust flows from the cathode recuperator 190 to the steam generator 160 through exhaust conduit 304C. Exhaust flows from the steam generator 160 and out of the hotbox 100 through system exhaust conduit 304D.

Water flows from a water source 162, such as a water tank or a water pipe, to the steam generator 160 through water conduit 306A. The steam generator 160 converts the water into steam using heat from the ATO exhaust provided by exhaust conduit 304C. Steam is provided from the steam generator 160 to the mixer 150 through water conduit 306B. Alternatively, if desired, the steam may be provided directly into the fuel inlet stream and/or the anode exhaust stream may be provided directly into the fuel inlet stream followed by humidification of the combined fuel streams. The mixer 150 is configured to mix the steam with anode exhaust and fuel. This fuel mixture may then be heated in the anode recuperator 110, before being provided to the stack 102.

The module 10 may further a system controller 225 configured to control various elements (e.g., blowers 182 and 184 and the fuel control valve) of the module 10. The controller 225 may include a central processing unit configured to execute stored instructions. For example, the controller 225 may be configured to control fuel and/or air flow through the module 10, according to fuel composition data.

Figure 2:
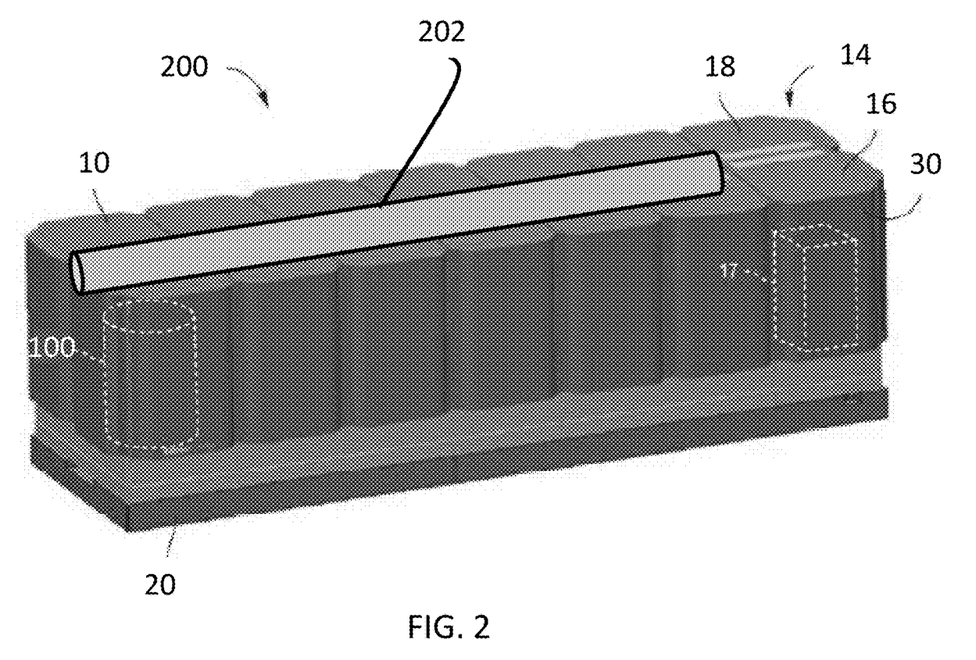
FIG. 2 is an isometric view of a modular fuel cell system that can be used with the exemplary embodiments.

FIG. 2 illustrates an exemplary modular fuel cell system 200 according to various embodiments of the present disclosure. Referring to FIG. 2, the modular system 200 may include the system 100 of FIG. 1 and may include a modular enclosure that provides flexible system installation and operation. Modules allow scaling of installed generating capacity, reliable generation of power, flexibility of fuel processing, and flexibility of power output voltages and frequencies with a single design set. The modular design results in an "always on" unit with very high availability and reliability. This design also provides an easy means of scale up and meets specific requirements of customer's installations. The modular design also allows the use of available fuels and required voltages and frequencies which may vary by customer and/or by geographic region.

The system 200 includes power modules 10, one or more fuel processing modules 16, and one or more power conditioning modules 18. For example, the system 200 may include any desired number of modules, such as 2-30 power modules 10, for example 6-12 power modules 10.

The fuel processing modules 16 is configured for pre-processing of fuel, such as desulfurizer beds. The fuel processing modules 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The fuel processing module 16 may processes at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, a reformer 17 may be located in the fuel processing module 16. Alternatively, if it is desirable to thermally integrate the reformer 17 with the fuel cell stack(s), then a separate reformer 17 may be located in each hot box 13 in a respective power module 10. Furthermore, if internally reforming fuel cells are used, then an external reformer 17 may be omitted entirely.

The system 200 may also include one or more power conditioning modules 18. The power conditioning module 18 includes a cabinet which contains the components for converting the fuel cell stack generated DC power to AC power (e.g., DC/DC and DC/AC converters described in U.S. Pat. No. 7,705,490, incorporated herein by reference in its entirety), electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one input/output cabinet 14. If a single input/output cabinet 14 is provided, then modules 16 and 18 may be located vertically (e.g., power conditioning module 18 components above the fuel processing module 16 desulfurizer canisters/beds) or side by side in the cabinet 14.

The linear array of power modules 10 is readily scaled. For example, more or fewer power modules 10 may be provided depending on the power needs of the building or other facility serviced by the fuel cell system 200. The power modules 10 and input/output modules 14 may also be provided in other ratios.

The modular fuel cell system 200 may be configured in a way to ease servicing of the system. All of the routinely or high serviced components (such as the consumable components) may be placed in a single module to reduce amount of time required for the service person. For example, the purge gas and desulfurizer material for a natural gas fueled system may be placed in a single module (e.g., a fuel processing module 16 or a combined input/output module 14 cabinet). This would be the only module cabinet accessed during routine maintenance. Thus, each module 10, 14, 16, and 18 may be serviced, repaired or removed from the system without opening the other module cabinets and without servicing, repairing or removing the other modules.

For example, as described above, the system 200 can include multiple power modules 10. When at least one power module 10 is taken off line (i.e., no power is generated by the stacks in the hot box 13 in the off line module 10), the remaining power modules 10, the fuel processing module 16 and the power conditioning module 18 (or the combined input/output module 14) are not taken off line. Furthermore, the fuel cell enclosure 10 may contain more than one of each type of module 10, 14, 16, or 18. When at least one module of a particular type is taken off line, the remaining modules of the same type are not taken off line.

Each of the power modules 10 and input/output modules 14 include a door 30 (e.g., hatch, access panel, etc.) to allow the internal components of the module to be accessed (e.g., for maintenance, repair, replacement, etc.). According to one embodiment, the modules 10 and 14 are arranged in a linear array that has doors 30 only on one face of each cabinet, allowing a continuous row of systems to be installed abutted against each other at the ends.

The system 200 may include an exhaust conduit 202 configured to receive exhaust output from the power modules 10. In particular, the exhaust conduit 202 may be fluidly connected to the system exhaust conduit 304D of each power module 10 (see FIG. 1).

Figure 3A:
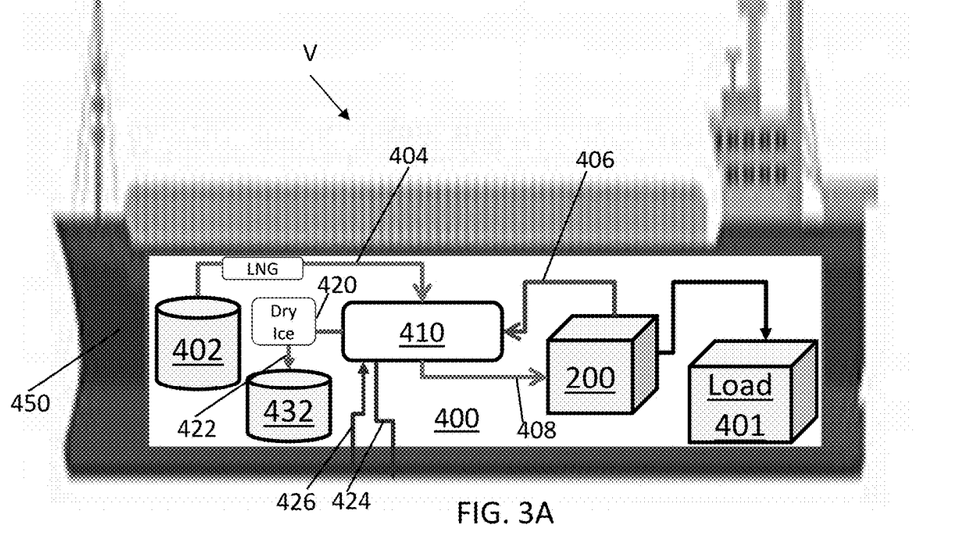
FIG. 3A is schematic view of a combined LNG fuel cell power and fluid processing system 400 in a vessel, according to various embodiments of the present disclosure.
Figure 3B:
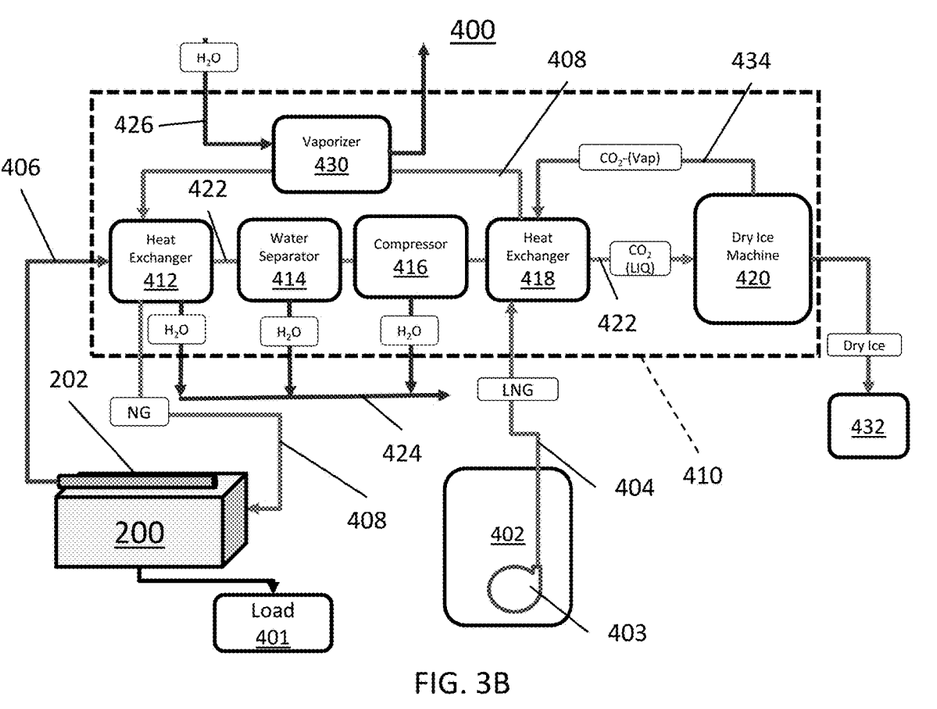
FIG. 3B is a schematic view showing components of a fluid processor of the system 400.

FIG. 3A is schematic view of a combined LNG fuel cell power and fluid processing system 400 in a vessel, according to various embodiments of the present disclosure, and FIG. 3B is a schematic view showing components of a fluid processor 410 of the system 400. Referring to FIGS. 3A and 3B, the system 400 may be disposed in a vessel V, such as a container ship or the like. The system 400 may include a fuel cell system 200, such the SOFC system 200 shown in FIG. 2, configured to provide electrical power to an electrical load 401 of the vessel and a fluid processor 410 configured to gasify LNG and sequester $CO_2$ as dry ice. As shown in FIG. 3A, the fluid processor 410 may be disposed outside of the fuel cell system 200. However, in other embodiments, one or more components of the fluid processor 410 may be disposed within the cabinet of the fuel cell system 200.

The fluid processor 410 may be fluidly connected to an LNG container 402 by an LNG conduit 404. The LNG container 402 may be configured to store LNG at a temperature of about at or below a temperature of about −163° C., e.g., below the −161° C. condensation temperature of natural gas. A pump or blower 403 configured to pump LNG from the container 402 to the fluid processor 410, may be disposed in the LNG container 402 or outside the LNG container 402 on the LNG conduit 404.

The exhaust conduit 202 of the fuel cell system 200 may be fluidly connected to an inlet of the fluid processor 410 by an exhaust inlet conduit 406. A fuel conduit 408 may fluidly connect an NG outlet of the fluid processor 410 to a fuel inlet of the fuel cell system 200. The fuel cell system 200 may be electrically connected to a load 401, such as a primary and/or secondary electrical load of the vessel V.

The fluid processor 410 may include an optional first heat exchanger 412, a water separator 414, such as a condenser or a dryer, a compressor 416, a second heat exchanger 418, and a dry ice machine 420, which may be sequentially fluidly connected in series by a processing conduit 422. The heat exchanger 412, water separator 414, and compressor 416 may be fluidly connected to a water collection conduit 424.

The first heat exchanger 412 may be configured to reduce the temperature of the fuel cell system exhaust. For example, in some embodiments, the first heat exchanger 412 may use air to cool the system exhaust. In other embodiments, the first heat exchanger 412 may utilize NG to cool the system exhaust. For example, the first heat exchanger 412 may be configured to cool the system exhaust to a temperature ranging from about 50° C. to about 1° C., to facilitate subsequent compression of $CO_2$ in the system exhaust. The system exhaust may be maintained above 0° C., in order to prevent freezing of water present in the system exhaust.

The first heat exchanger 412 may also increase the temperature of the NG provided thereto, in order to improve the efficiency of the fuel cell system 200. For example, the first heat exchanger 412 may heat the NG to a temperature ranging from about 300° C. to about 100° C. A first water stream may be removed from the first heat exchanger 412 to the water collection conduit 424 if the temperature of the system exhaust is below 100° C. in the first heat exchanger 412.

The water separator 414 may be configured to remove residual water from the cooled fuel exhaust output from the heat exchanger 412 to the water collection conduit 424. The water separator 414 may include a condenser or a regeneratable water absorbent, for example, which adsorbs water via temperature swing adsorption or another suitable method. However, in some embodiments, the water separator 414 may be omitted.

The compressor 416 may be configured to compress the dried system exhaust received from the water separator 414. Water extracted by the heat exchanger 412, water separator 414, and/or compressor 416 may be collected by the collection conduit 424.

The dried system exhaust output from the compressor 416 comprising mostly carbon dioxide may be provided to the second heat exchanger 418. The second heat exchanger 418 may be configured to cool the dried exhaust to a temperature sufficient to generate liquid $CO_2$ using LNG output from the container 402. For example, the second heat exchanger 418 may be configured to cool the dried exhaust to a temperature ranging from about −20° C. to about −30° C.

In some embodiments, the second heat exchanger 418 may be configured to gradually heat the LNG to vaporize the LNG and form NG using the heat from the system exhaust. The second heat exchanger 418 may also permit the gradual expansion of the LNG as it is converted to NG. As shown in FIG. 3B, the NG may be provided to the first heat exchanger 412 by the fuel conduit 408. However, in other embodiment, the fuel conduit 408 may provide the NG directly to the fuel cell system 200, and the first heat exchanger 412 may be provided with air to cool the system exhaust.

In some embodiments, the fluid processor 410 may optionally include a vaporizer 430. For example, if the heat provided by the system exhaust is insufficient to completely vaporize the LNG, the vaporizer 430 may operate to vaporize and expand the LNG using heat extracted from a second fluid. For example, the vaporizer 430 may be operated during system startup, or during periods of the fuel system 200 is operated under low load conditions. The second fluid may be water provided via the water conduit 426 from a water tank on the vessel V, or may be fresh or seawater provided via the water conduit 426 from outside of the vessel V.

The liquid $CO_2$ may be output from the second heat exchanger 418 to the dry ice machine 420. The dry ice machine 420 may be a block press or pelletizer configured to generate dry ice blocks or pellets, by reducing the pressure applied to the liquid $CO_2$ to atmospheric pressure, which converts the liquid $CO_2$ into dry ice. $CO_2$ vapor generated during the dry ice formation may be returned to the second heat exchanger 418, via a $CO_2$ vapor conduit 434. The dry ice may be provided to a freezer 432 for storage. In other embodiments, the dry ice may be utilized as a coolant on board the vessel V and/or may be offloaded from the vessel V for sequestration once the vessel V returns to a port. For example, the dry ice may be utilized as a $CO_2$ source for cement manufacturing or may be sequestered underground.

In one embodiment, the vessel V comprises a ship (i.e., a boat) containing a ship hull 450. The system 400 and the load 401 are located in the ship hull 450.

Accordingly, the system 400 may be configured to vaporize LNG using exhaust heat generated during power production. In addition, the system may utilize extreme cold of the LNG to generate dry ice, and thereby capture $CO_2$ from the system exhaust. The NG provided by the fuel conduit 408 may be used by the power modules 10 of the fuel cell system 200 to generate electricity. The electricity may be used to power one or more loads 401 aboard a vessel. As such, the fuel cell system may operate as a low or zero carbon emission primary or secondary power source of a vessel.

Figure 4:
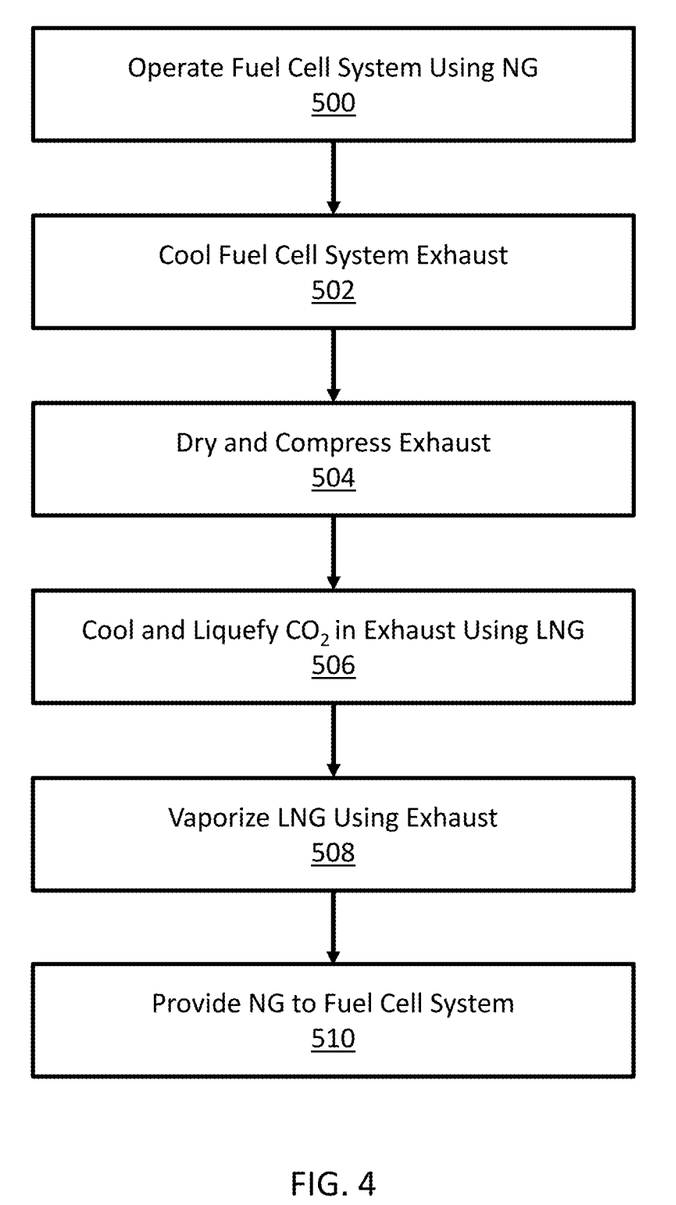
FIG. 4 is a block diagram illustrating a method of combined power generation and $CO_2$ sequestration, according to various embodiments of the present disclosure.

FIG. 4 is a block diagram illustrating a method of operating the system 400 of FIGS. 3A and 3B, according to various embodiments of the present disclosure. Referring to FIGS. 3A, 3B, and 4, in step 500, the method may include operating a fuel cell system, such as system 200, using NG provided from an LNG storage tank 402 to generate electrical power. The power may be provided to electrical loads of a vessel, such as electrical propulsion system and/or lighting, pumps, climate control, etc. The power may also be provided to operate elements of the fluid processing system, such as pumps, compressors, block presses, etc.

In step 502, the method may include cooling system exhaust generated by the fuel cell system 200. In particular, the NG and system exhaust can be provided to the first heat exchanger 412 to cool the system exhaust using cool NG and heat the NG using hot system exhaust. In other embodiments, air or water can be substituted for the NG as a cooling fluid in the first heat exchanger 412. Water vapor condensed from the cooled system exhaust may be collected from the first heat exchanger 412 during the cooling process.

In step 504, the cooled exhaust may be dried and compressed. For example, water vapor may be removed from the cooled exhaust by supplying the cooled exhaust to the water separator 414. The dried exhaust may be compressed in the compressor 416 to an increased pressure ranging from about 518 KPa to about 10 MPa, thereby generating compressed $CO_2$. Water condensed in the compressor 416 may be removed from the compressor 416 and collected in the conduit 424.

In step 506, the compressed $CO_2$ may be cooled using the cold LNG to liquefy the $CO_2$. For example, the $CO_2$ may be cooled in the second heat exchanger 418 to a temperature ranging from about −56.6° C. to about −10° C., such as from about −20° C. to about −30° C. The liquid $CO_2$ may be provided to the dry ice machine 420, where the pressure applied to the liquid $CO_2$ may be released to form dry ice. The LNG is heated by the warm compressed system exhaust comprising a majority $CO_2$ by volume.

In step 508, LNG may be vaporized to generate the NG. For example, the LNG may be heated in the second heat exchanger 418 and allowed to expand, during the generation of the liquid $CO_2$. In other embodiments, the LNG and/or a mixture of LNG and NG may be provided to the optional vaporizer 430, to convert any remaining LNG into NG. The vaporizer 430 may be provided with a fluid, such as sea water, air, or the like, to exchange heat with the LNG.

In step 510, the NG may be provided to the fuel cell system 200 to generate power which may be provided to operate electrical loads 401 onboard a vessel V. In some embodiments, the NG may be provided to the first heat exchanger 412, before being provided to the fuel cell system 200.

The foregoing method descriptions and diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods. In addition, the term "about" refers to a variation of +/−10% or less.

One or more diagrams have been used to describe exemplary embodiments. The use of diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. A combined system for power generation and $CO_2$ sequestration, comprising:
    a fuel cell system configured to generate power using natural gas (NG);
    a container configured to store liquid natural gas (LNG); and
    a fluid processor configured to convert LNG received from the container into NG and to convert exhaust output from the fuel cell system to dry ice by transferring heat between and the LNG and the exhaust, wherein the fluid processor comprises:
        a first heat exchanger configured to cool the exhaust output from the fuel cell system; and
        a compressor configured to compress the cooled fuel cell system exhaust output from the first heat exchanger.

2. The combined system of claim 1, wherein the fluid processor further comprises:
    a second heat exchanger configured to generate liquid $CO_2$ by transferring heat between the compressed exhaust output from the compressor and the LNG received from the container; and
    a dry ice machine configured to convert the liquid $CO_2$ received from the second heat exchanger to the dry ice.

3. The combined system of claim 2, wherein the second heat exchanger is configured to generate NG by vaporizing LNG received from the container.

4. The combined system of claim 2, wherein the fluid processor further comprises a vaporizer configured to vaporize any LNG received from the second heat exchanger.

5. The combined system of claim 4, wherein the vaporizer is configured to heat the received LNG using sea water.

6. The combined system of claim 1, wherein the first heat exchanger is configured to cool the exhaust output from the fuel cell system using ambient air.

7. A combined system for power generation and $CO_2$ sequestration, comprising:
    a fuel cell system configured to generate power using natural gas (NG);
    a container configured to store liquid natural gas (LNG);
    a fluid processor configured to convert LNG received from the container into NG and to convert exhaust output from the fuel cell system to dry ice by transferring heat between the LNG and the exhaust, wherein the fluid processor comprises:
        a first heat exchanger configured to cool the exhaust output from the fuel cell system;
        a compressor configured to compress the cooled exhaust output from the first heat exchanger;
        a second heat exchanger configured to generate liquid $CO_2$ by transferring heat between the compressed exhaust output from the compressor and the LNG received from the container; and
        a dry ice machine configured to convert the liquid $CO_2$ received from the second heat exchanger to the dry ice, and
    wherein the first heat exchanger is configured to cool the exhaust output from the fuel cell system using the NG output from the second heat exchanger.

8. The combined system of claim 1, wherein the first heat exchanger and the compressor are configured to collect and output water condensed from the exhaust.

9. The combined system of claim 1, wherein the fluid processor further comprises a water separator configured to remove water vapor from the cooled exhaust received from the first heat exchanger and output dry $CO_2$ to the compressor.

10. The combined system of claim 1, wherein the fuel cell system comprises power modules comprising solid oxide fuel cells.

11. A vessel, comprising:
a ship hull;
the combined system of claim 1 located in the ship hull;
an electrical load located in the ship hull and configured to be driven by power output from the fuel cell system.

12. The vessel of claim 11, wherein the fluid processor comprises a vaporizer configured to vaporize LNG received from the container using sea water.

13. A method of combined power generation and $CO_2$ sequestration, comprising:
providing natural gas (NG) to a fuel cell system to generate power;
cooling exhaust output from fuel cell system using a first heat exchanger;
compressing the cooled fuel cell system exhaust output from the first heat exchanger using a compressor;
cooling the compressed exhaust output from the compressor using a second heat exchanger provided with liquid natural gas (LNG) to generate liquid $CO_2$;
converting the liquid $CO_2$ into dry ice;
vaporizing the LNG to generate the NG; and
providing the generated NG to the fuel cell system.

14. The method of claim 13, wherein the vaporizing the LNG comprises using the second heat exchanger to transfer heat between the LNG and the compressed exhaust.

15. The method of claim 13, wherein the vaporizing the LNG comprises using seawater provided to a vaporizer to heat any LNG output from the second heat exchanger.

16. The method of claim 13, wherein the cooling exhaust output from fuel cell system comprises using the first heat exchanger to cool the exhaust output from the fuel cell system using the NG output from the second heat exchanger and removing condensed water from the first heat exchanger.

17. The method of claim 13, wherein the compressing cooled exhaust output from the first heat exchanger comprises removing condensed water from the compressor.

18. The method of claim 13, further comprising drying the cooled exhaust output from the first heat exchanger using a water separator.

19. The method of claim 13, wherein the cooling exhaust output from fuel cell system comprises using air or the generated NG to cool the output exhaust.

20. The method of claim 13, further comprising providing the power generated by the fuel cell system to an electrical load of ship, wherein the fuel cell system is located on the ship.

* * * * *